(12) United States Patent
Koseoglu

(10) Patent No.: US 9,868,914 B2
(45) Date of Patent: Jan. 16, 2018

(54) INTEGRATED HYDROTREATING AND ISOMERIZATION SYSTEM WITH AROMATIC SEPARATION

(71) Applicant: Saudi Arabian Oil Company

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/397,251

(22) Filed: Jan. 3, 2017

(65) Prior Publication Data

US 2017/0114290 A1 Apr. 27, 2017

Related U.S. Application Data

(60) Division of application No. 14/331,536, filed on Jul. 15, 2014, now Pat. No. 9,556,389, which is a (Continued)

(51) Int. Cl.
*C10G 69/02* (2006.01)
*B01D 11/04* (2006.01)
(Continued)

(52) U.S. Cl.
CPC ........... *C10G 69/02* (2013.01); *B01D 11/043* (2013.01); *B01D 11/0457* (2013.01);
(Continued)

(58) Field of Classification Search
CPC .............. C10G 69/02; C10G 2300/202; C10G 2300/1096; B01D 11/0461;
(Continued)

(56) References Cited

U.S. PATENT DOCUMENTS 2,799,627 A 7/1957 Haensel
2,995,612 A * 8/1961 Hervert .................... B01J 19/18
137/13

(Continued)

FOREIGN PATENT DOCUMENTS

WO 2005056728 A2 6/2005

OTHER PUBLICATIONS

Newton et al, Liquid-Liquid Extraction in a Pulsed column, Jun. 2004, AlChE journal.*

(Continued)

*Primary Examiner* — Juan Valencia
(74) *Attorney, Agent, or Firm* — Abelman, Frayne & Schwab

(57) ABSTRACT

Deep desulfurization of hydrocarbon feeds containing undesired organosulfur compounds to produce a hydrocarbon product having low levels of sulfur, i.e., 15 ppmw or less of sulfur, is achieved by hydrotreating the feed under mild conditions, and separating the hydrotreated effluent into an aromatic-rich fraction which contains a substantial amount of the aromatic refractory and sterically hindered sulfur-containing compounds, and an aromatic-lean fraction. The aromatic-rich fraction is contacted with isomerization catalyst, and the isomerized aromatic-rich fraction is recycled to the mild hydrotreating process.

23 Claims, 9 Drawing Sheets

Related U.S. Application Data continuation of application No. 13/559,814, filed on Jul. 27, 2012, now Pat. No. 8,852,426.

(60) Provisional application No. 61/513,250, filed on Jul. 29, 2011.

(51) Int. Cl.

| | |
|---|---|
| B01D 17/02 | (2006.01) |
| B01D 17/04 | (2006.01) |
| C10G 25/00 | (2006.01) |
| C10G 65/04 | (2006.01) |
| C10G 67/04 | (2006.01) |
| C10G 67/06 | (2006.01) |
| C10G 65/12 | (2006.01) |
| C10G 21/12 | (2006.01) |

(52) U.S. Cl.
CPC ...... *B01D 11/0461* (2013.01); *B01D 17/0202* (2013.01); *B01D 17/0217* (2013.01); *B01D 17/041* (2013.01); *B01D 17/047* (2013.01); *C10G 21/12* (2013.01); *C10G 25/00* (2013.01); *C10G 65/043* (2013.01); *C10G 65/12* (2013.01); *C10G 67/04* (2013.01); *C10G 67/0418* (2013.01); *C10G 67/0436* (2013.01); *C10G 67/06* (2013.01); *C10G 2300/1096* (2013.01); *C10G 2300/202* (2013.01); *C10G 2300/4081* (2013.01); *C10G 2300/44* (2013.01)

(58) Field of Classification Search
CPC ............ B01D 11/0457; B01D 17/0202; B01D 17/0217; B01D 11/043
See application file for complete search history.

(56) References Cited

U.S. PATENT DOCUMENTS

| | | | |
|---|---|---|---|
| 4,118,429 A * | 10/1978 | Fritsch | C07C 5/2702 208/143 |
| 4,128,593 A | 12/1978 | Fritsch et al. | |
| 4,155,846 A * | 5/1979 | Novak | G01N 30/6069 210/198.2 |
| 4,173,529 A | 11/1979 | Bauer | |
| 4,359,596 A | 11/1982 | Howard et al. | |
| 4,447,315 A | 5/1984 | Lamb et al. | |
| 4,592,832 A | 6/1986 | Bristow et al. | |
| 4,628,391 A * | 12/1986 | Nyman | B01D 11/0457 366/265 |
| 4,851,109 A | 7/1989 | Chen et al. | |
| 4,909,927 A | 3/1990 | Bell | |
| 5,004,853 A | 4/1991 | Barger et al. | |
| 5,011,593 A | 4/1991 | Ware et al. | |
| 5,021,143 A | 6/1991 | Franckowiak et al. | |
| 5,110,445 A | 5/1992 | Chen et al. | |
| 5,124,023 A | 6/1992 | Bosserman et al. | |
| 5,190,633 A | 3/1993 | Fetzer et al. | |
| 5,290,427 A | 3/1994 | Fletcher et al. | |
| 5,409,599 A | 4/1995 | Harandi | |
| 5,536,391 A | 7/1996 | Howley et al. | |
| 5,880,325 A | 3/1999 | Alward et al. | |
| 5,897,768 A | 4/1999 | McVicker et al. | |
| 6,113,775 A | 9/2000 | Christolini et al. | |
| 6,171,478 B1 | 1/2001 | Cabrera et al. | |
| 6,248,230 B1 | 6/2001 | Min et al. | |
| 6,638,419 B1 | 10/2003 | Da Silva et al. | |
| 6,676,829 B1 | 1/2004 | Angevine et al. | |
| 6,866,772 B2 | 3/2005 | Selai et al. | |
| 6,929,738 B1 | 8/2005 | Riley et al. | |
| 7,374,666 B2 | 5/2008 | Wachs | |
| 7,431,827 B2 | 10/2008 | Rock et al. | |
| 7,731,838 B2 | 6/2010 | McConnachie et al. | |
| 7,794,585 B2 | 9/2010 | Leonard et al. | |
| 2004/0035752 A1 | 2/2004 | Marchal-George et al. | |
| 2004/0222153 A1* | 11/2004 | Baniel | B01D 11/0446 210/634 |
| 2008/0093260 A1 | 4/2008 | Koseoglu | |
| 2008/0105595 A1 | 5/2008 | Koseoglu | |
| 2008/0116112 A1 | 5/2008 | Umansky et al. | |
| 2008/0308463 A1 | 12/2008 | Keckler et al. | |
| 2009/0065398 A1 | 3/2009 | McConnachie et al. | |
| 2009/0084709 A1 | 4/2009 | Choi | |
| 2009/0105515 A1* | 4/2009 | Winter | B01D 15/1807 585/822 |
| 2009/0107890 A1 | 4/2009 | Hamad et al. | |
| 2009/0145807 A1 | 6/2009 | Choi et al. | |
| 2011/0259793 A1 | 10/2011 | Umansky et al. | |
| 2012/0024751 A1 | 2/2012 | He | |

OTHER PUBLICATIONS

Hansford, Roland C., Ward, John W., "The Nature of Active Sites on Zeolites, VII. Relative Activities of Crystalline and Amorphous Alumino-Silicates", Journal of Catalysis, vol. 13, (1969), 316-320.

Isoda, Takaai, Nagao, Shinichi, Ma, Xiaoliang, Korai, Yozo, Mochida, Isao "Hydrodesulfurization Pathway of 4,6-Dimethyldibenzothiophene through Isomerization over Y-Zeolite Containing CoMo/Al2O3 Catalyst." Energy Fuels, 1996, 10, 1078-1082.

Isoda, Takaai, Takase, Yoyoto, Kusakabe, Katsuki, Morooka, Shigeharu. "Changes in Desulfurization Reactivity of 4,6-Dimethyldibenzothiophene by Skeletal Isomerization Using a Ni-Supported Y-Type Zeolite." Energy Fuels, 2000, vol. 14, 585-590.

M.V. Landau et al., "Tail-Selective Hydrocracking of Heavy Gas Oil in Diesel Production." Studies in Surface Science and Catalysis, vol. 106, 1997, 371-378.

Petr Steiner et al., "Catalytic hydrodesulfurization of a light gas oil over a NiMo catalyst: kinetics of selected sulfur aomponents." Fuel Processing Technology, vol. 79, Issue 1, Aug. 2, 2002, 1-12.

Song, New Approaches to Deep Desulfurization for Ultra-Clean Gasoline and Diesel Fuels: An Overview, 2002, Fuel Chemistry Division Prepints, 47 (2), 438-444.

Ruixiang Hua et al., "Determination of sulfur-containing compounds in diesel oils by comprehensive two-dimensional gas chromatography with a sulfur chemiluminescence detector." Journal of Chromatography, vol. 1019, Issues 1-2, Nov. 2003, 101-109.

PCT/US2012/048466, International Search Report and Written Opinion dated Jul. 5, 2013, 12 pages.

* cited by examiner

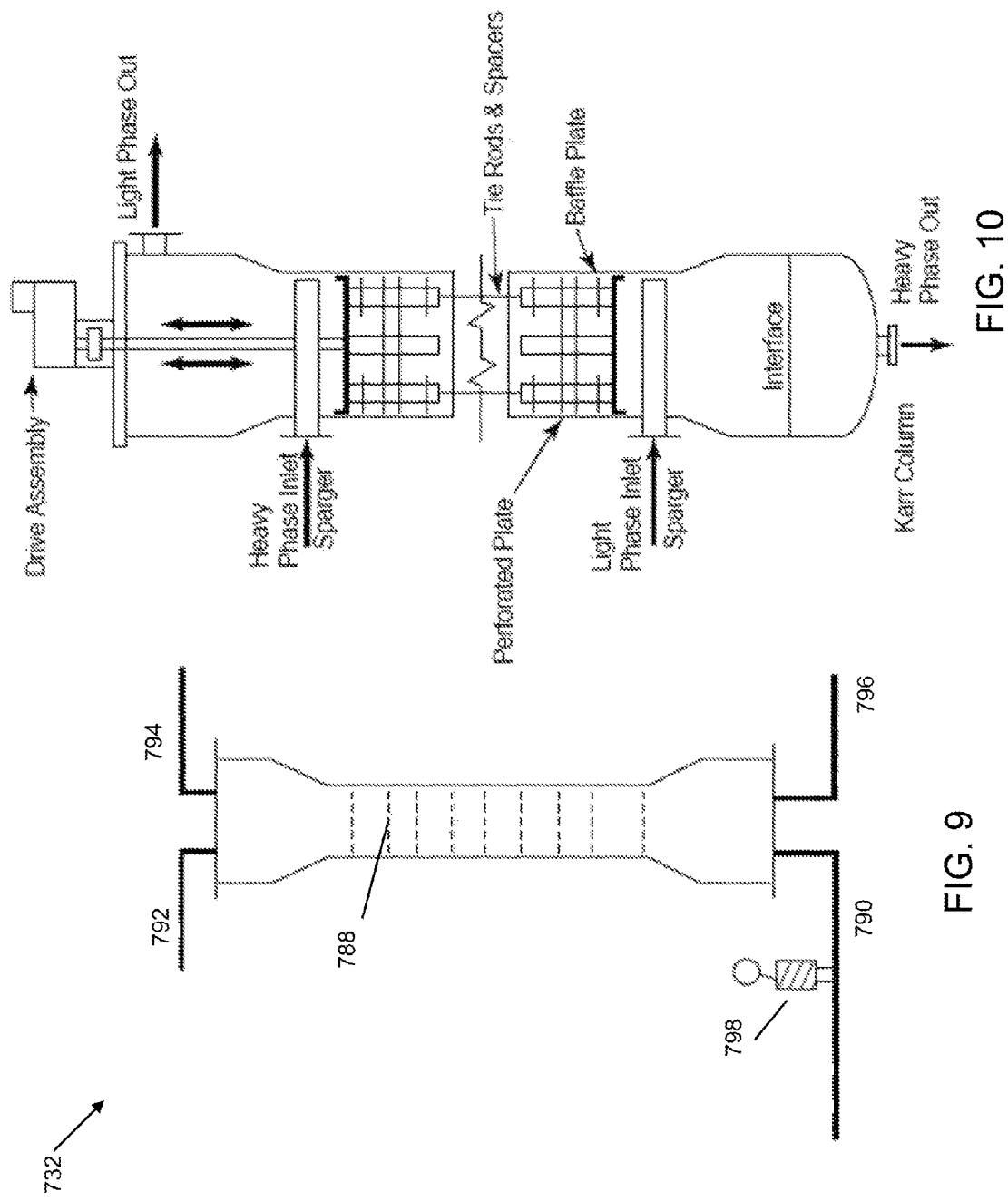

INTEGRATED HYDROTREATING AND ISOMERIZATION SYSTEM WITH AROMATIC SEPARATION

RELATED APPLICATIONS

This application is a divisional application of U.S. patent application Ser. No. 14/331,536 filed on Jul. 15, 2014, which is a continuation application of U.S. patent application Ser. No. 13/559,814 filed on Jul. 27, 2012, which claims priority to provisional U.S. Patent Application Ser. No. 61/513,250 filed Jul. 29, 2011, the contents of which are all incorporated herein by reference.

BACKGROUND OF THE INVENTION

Field of the Invention

The present invention relates to hydrotreating processes to efficiently reduce the sulfur content of hydrocarbons.

Description of Related Art

The discharge into the atmosphere of sulfur compounds during processing and end-use of the petroleum products derived from sulfur-containing sour crude oil poses health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, refineries have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the footsteps of the United States and the European Union and are moving forward with regulations that will require refineries to produce transportation fuels with ultra-low sulfur levels.

To keep pace with recent trends toward production of ultra-low sulfur fuels, refiners must choose among the processes or crude oils that provide flexibility that ensures future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors in these facilities because of the comparatively more severe operational requirements (i.e., higher temperature and pressure) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively mild conditions (i.e., low hydrogen partial pressures of 30 kilograms per square centimeter for straight run gas oils boiling in the range of from 180° C. to 370° C.).

With the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by incorporating gas purification systems, reengineering the internal configuration and components of reactors, and/or deployment of more active catalyst compositions.

Sulfur-containing compounds that are typically present in hydrocarbon fuels include aliphatic molecules such as sulfides, disulfides and mercaptans as well as aromatic molecules such as thiophene, benzothiophene and its long chain alkylated derivatives, and dibenzothiophene and its alkyl derivatives such as 4,6-dimethyl-dibenzothiophene.

Aliphatic sulfur-containing compounds are more easily desulfurized (labile) using mild hydrodesulfurization methods. However, certain highly branched aromatic molecules can sterically hinder the sulfur atom removal and are moderately more difficult to desulfurize (refractory) using mild hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly by current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

The relative reactivity of thiols and sulfides are much higher than those of aromatic sulfur compounds, as indicated in a study published in Song, Chunshan, "An Overview of New Approaches to Deep Desulfurization for Ultra-Clean Gasoline, Diesel Fuel and Jet Fuel," Catalysis Today, 86 (2003), pp. 211-263. Mercaptans/thiols and sulfides are much more reactive than the aromatic sulfur compounds. It should be noted that non-thiophenic sulfides such as paraffinic and/or naphthenic are present in diesel range hydrocarbons as can be seen from the relative reactivity chart shown in FIG. 1.

Studies have been conducted related to increasing the relative reactivity of sterically hindered sulfur-containing hydrocarbons. In particular, isomerization of 4,6-dimethyldibenzothiophene into methyl-migrated isomers and tri- or tetramethyl-dibenzothiophenes was studied. Seelsoda et al., "Hydrodesulfurization Pathway of 4,6-Dimethyldibenzothiophene Through Isomerization over Y-Zeolite Containing CoMo/Al$_2$O$_3$ Catalyst", *Energy & Fuels,* 1996, 10, 1078-1082, and Isoda et al., "Changes in Desulfurization Reactivity of 4,6-Dimethyldibenzothiophene by Skeletal Isomerization Using a Ni-Supported Y-Type Zeolite," *Energy & Fuels,* 2000, 14, 585-590.

McConnachie, et al. U.S. Pat. No. 7,731,838 describes a process in which a diesel boiling range feedstream which includes nitrogen-containing compounds and hindered dibenzothiophenes is subjected to removal of nitrogen-containing compounds by contacting the feedstream with a sulfuric acid solution, contacting the reduced nitrogen stream with a solid acid catalyst to isomerize certain sulfur-containing molecules; and hydrotreating the isomerized effluent. However, the described process in McConnachie, et al. prefers that the entire feed is both subjected to the removal of nitrogen-containing compounds by contacting the feedstream with a sulfuric acid solution, and contacted with the costly and sensitive (i.e., easily poisoned) solid acid isomerization catalyst. This requires that the nitrogen-removal apparatus have a capacity suitable for the entire feedstream, and impart excessive demand on this isomerization catalyst and its reactor capacity.

McVicker, et al. U.S. Pat. No. 5,897,768 teaches a desulfurization process in which an entire feedstream is hydrotreated using conventional catalysts. The partially hydrotreated effluent is fractionated, whereby sterically hindered sulfur-containing hydrocarbons are removed with the bottoms stream. The bottoms stream is passed to a reactor containing isomerization catalyst. The effluent from the reactor containing isomerization catalyst is returned to the hydrotreating reactor. However, in McVicker, et al., the entire initial feed is passed through the hydrotreating reactor, including refractory sulfur-containing hydrocarbons which are likely not desulfurized in this initial pass-through, thus decreasing the overall process efficiency.

None of the above-mentioned references describe processes for desulfurization of including specific sub-processes and apparatus for targeting different organosulfur compounds. With the steady increase in demand for hydrocarbon fuels having an ultra-low sulfur level, a need exists for an efficient and effective process and apparatus for desulfurization.

SUMMARY OF THE INVENTION

Accordingly, it is an object of the present invention to desulfurize a hydrocarbon fuel stream containing different classes of sulfur-containing compounds having different reactivities.

In accordance with one or more embodiments, the invention relates to a system and method of hydrotreating hydrocarbon feedstocks to efficiently reduce the sulfur content.

In accordance with one or more embodiments, an integrated process for treating a feedstock to reduce the concentration of undesired organosulfur compounds is provided. The method comprises:

a. subjecting the initial hydrocarbon feedstock to a hydrotreating zone operating under conditions effective to convert labile organosulfur compounds, including aliphatic molecules such as sulfides, disulfides, mercaptans and produce a hydrotreated effluent containing converted compounds and unconverted refractory aromatic organosulfur compounds;

b. separating the hydrotreated effluent into an aromatic-lean fraction and an aromatic-rich fraction that contains refractory aromatic organosulfur compounds;

c. contacting the aromatic-rich fraction with an isomerization catalyst in the presence of hydrogen to remove steric hindrance of certain compounds and produce an isomerized effluent including isomerate and any remaining unreacted hydrogen; and d. recycling the isomerized effluent to the hydrotreating zone.

Unlike typical known methods, the present process separates the initial feedstock into fractions containing different classes of compounds with different reactivities relative to the conditions of hydrotreating. Conventionally, most approaches subject the entire feedstock to the same hydrotreating reaction zones, necessitating operating conditions that must accommodate feed constituents that require increased severity for conversion, or alternatively sacrifice overall yield to attain desirable process economics.

In accordance with one or more additional embodiments, a method of hydrotreating hydrocarbon feedstocks further includes contacting the aromatic-rich fraction with an adsorbent material to reduce the nitrogen content to produce an adsorption treated effluent.

In accordance with one or more additional embodiments, a method of hydrotreating hydrocarbon feedstocks further includes flashing the hydrotreated effluent to produce a light hydrotreated effluent boiling 340° C. and below and a heavy hydrotreated effluent boiling above 340° C. Light hydrotreated effluent is recovered for inclusion in a fuel pool. Heavy hydrotreated effluent is separated into an aromatic-lean fraction and an aromatic-rich fraction, or recycled back to the hydrotreating zone.

In accordance with one or more additional embodiments, a method of hydrotreating hydrocarbon feedstocks further includes flashing the isomerized effluent to produce a light isomerized effluent boiling 340° C. and below and a heavy isomerized effluent boiling above 340° C. Light isomerized effluent is recovered for inclusion in a fuel pool. Heavy isomerized effluent is separated into an aromatic-lean fraction and an aromatic-rich fraction, or recycled back to the hydrotreating zone.

As used herein, the terms "hydrotreating" and "hydrodesulfurizing," as well as variants of these terms, may be used interchangeably.

As used herein, the term "labile organosulfur compounds" means organosulfur compounds that can be easily desulfurized under relatively mild hydrodesulfurization pressure and temperature conditions, and the term "refractory organosulfur compounds" means organosulfur compounds that are relatively more difficult to desulfurize under mild hydrodesulfurization conditions.

Additionally, as used herein, the terms "mild hydrotreating," "mild operating conditions" and "mild conditions" (when used in reference to hydrotreating or hydrodesulfurization) means hydrotreating processes operating at temperatures of 400° C. and below, hydrogen partial pressures of 40 bars and below, and hydrogen feed rates of 500 standard liters per liter of oil and below.

Since aromatic extraction operations typically do not provide sharp cut-offs between the aromatics and non-aromatics, the aromatic-lean fraction contains a major proportion of the non-aromatic content of the hydrotreated effluent and a minor proportion of the aromatic content of the hydrotreated effluent, and the aromatic-rich fraction contains a major proportion of the aromatic content of the hydrotreated effluent and a minor proportion of the non-aromatic content of the hydrotreated effluent. The amount of non-aromatics in the aromatic-rich fraction, and the amount of aromatics in the aromatic-lean fraction, depend on various factors as will be apparent to one of ordinary skill in the art, including the type of extraction, the number of theoretical plates in the extractor (if applicable to the type of extraction), the type of solvent and the solvent ratio.

The feed portion that is extracted into the aromatic-rich fraction includes aromatic compounds that contain heteroatoms and those that are free of heteroatoms. Aromatic compounds that pass to the aromatic-rich fraction include aromatic organosulfur compounds, such as a certain portion of the thiophene content from the feed, long chain alkylated derivatives of thiophene, benzothiophene, alkylated derivatives of benzothiophene, dibenzothiophene, alkyl derivatives of dibenzothiophene such as sterically hindered 4,6-dimethyl-dibenzothiophene, benzonaphtenothiophene, and alkyl derivatives of benzonaphtenothiophene. Aromatic compounds that pass to the aromatic-rich fraction also include aromatic nitrogen compounds such as pyrrole, quinoline, acridine, carbazoles and their derivatives. These nitrogen- and sulfur-containing aromatic compounds are targeted in the aromatic separation step(s) generally by their solubility in the extraction solvent. In certain embodiments, selectivity of the nitrogen- and sulfur-containing aromatic compounds is enhanced by use of additional stages and/or selective sorbents. Various non-aromatic organosulfur compounds that may have been present in the initial feed, i.e., prior to hydrotreating, include mercaptans, sulfides and disulfides. Depending on the aromatic extraction operation type and/or condition, a preferably very minor portion of non-aromatic nitrogen- and sulfur-containing compounds can pass to the aromatic-rich fraction.

As used herein, the term "major proportion of the non-aromatic compounds" means at least greater than 50 weight % (W %) of the non-aromatic content of the feed to the extraction zone, in certain embodiments at least greater than about 85 W %, and in further embodiments greater than at least about 95 W %. Also as used herein, the term "minor proportion of the non-aromatic compounds" means no more than 50 W % of the non-aromatic content of the feed to the extraction zone, in certain embodiments no more than about 15 W %, and in further embodiments no more than about 5 W %.

Also as used herein, the term "major proportion of the aromatic compounds" means at least greater than 50 W % of the aromatic content of the feed to the extraction zone, in certain embodiments at least greater than about 85 W %, and in further embodiments greater than at least about 95 W %. Also as used herein, the term "minor proportion of the aromatic compounds" means no more than 50 W % of the aromatic content of the feed to the extraction zone, in certain embodiments no more than about 15 W %, and in further embodiments no more than about 5 W %.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The foregoing summary as well as the following detailed description will be best understood when read in conjunction with the attached drawings. It should be understood, however, that the invention is not limited to the precise arrangements and apparatus shown. In the drawings the same or similar numerals are used to identify to the same or similar elements, in which:

FIGS. 5-10 show various examples of apparatus suitable for use as the aromatic extraction zone.

DETAILED DESCRIPTION OF THE INVENTION

Figure 1:
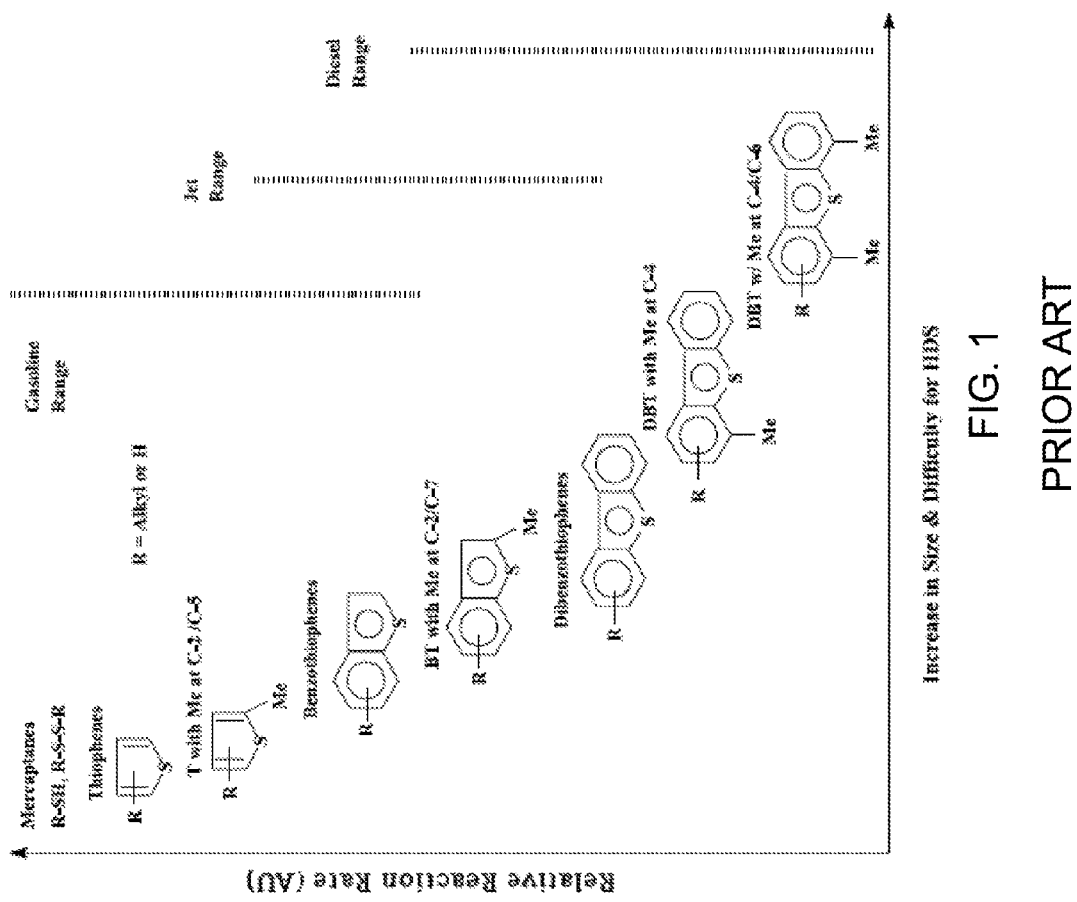
FIG. 1 is a relative reactivity chart showing relative reactivities of various compounds in the hydrodesulfurization process with the increase in size of the sulfur-containing molecule.

The above objects and further advantages are provided by the apparatus and process for desulfurization of hydrocarbon feeds containing both refractory and labile organosulfur compounds. An aromatic separation zone is arranged downstream of a hydrotreating zone operating under mild reaction conditions. The hydrotreated liquid effluents after gas/liquid separation is separated to obtain a desulfurized aromatic-lean fraction, and an aromatic-rich fraction containing refractory organosulfur compounds. The aromatic-rich fraction, in certain embodiments after adsorption to remove nitrogen-containing compounds, is passed to a reactor containing isomerization catalyst. The isomerized aromatic-rich fraction is returned to the hydrotreating reactor for further hydrodesulfurization.

The integrated system and process is capable of efficiently and cost-effectively reducing the organosulfur content of hydrocarbon fuels. Deep desulfurization of hydrocarbon fuels effectively optimizes use of integrated apparatus and processes, combining mild hydrotreating, aromatic separation and catalytic isomerization. Refiners can use existing hydrotreating refinery unit operations under relatively mild operating conditions.

The inclusion of an aromatic separation zone in an integrated system and process combining hydrodesulfurization and catalytic isomerization allows a partition of the different classes of sulfur-containing compounds according to their respective reactivity factors, thereby optimizing and economizing mild hydrotreating and catalytic isomerization unit operations. The volumetric/mass flow through the catalytic isomerization zone is reduced, since its influent is limited to the aromatic-rich fraction of the hydrotreated effluent. As a result, the requisite equipment capacity, and accordingly both the capital equipment cost and the operating costs, are minimized.

Furthermore, product quality is improved by the integrated process herein since undesired side reactions associated with catalytic isomerization of the non-aromatic portion of the hydrotreated effluent including labile hydrocarbons using solid acid catalysts are avoided.

In accordance with one or more embodiments, the invention relates to systems and methods of hydrotreating hydrocarbon feedstocks to produce clean hydrocarbon fuels with an ultra-low level of sulfur. An integrated three-stage hydrotreating process includes:

a. hydrotreating the initial hydrocarbon feedstock in a hydrotreating zone operating under mild conditions to remove at least a portion of labile organosulfur compounds, including aliphatic molecules such as sulfides, disulfides, mercaptans, and to remove isomerized organosulfur compounds;

b. separating the hydrotreated effluent in an aromatic extraction zone to obtain an aromatic-lean fraction and an aromatic-rich fraction; and c. the aromatic-rich fraction, which contains organosulfur compounds that are primarily refractory organosulfur compounds, including aromatic molecules such as certain benzothiophenes (e.g., long chain alkylated benzothiophenes), dibenzothiophene and alkyl derivatives such as sterically hindered 4,6-dimethyldibenzothiophene, is passed to an isomerization reaction zone to convert sterically hindered refractory organosulfur compounds into isomers which are more reactive to hydrotreating under mild operating conditions, and the isomerized effluent is recycled to the mild hydrotreating process.

In hydrocarbon feeds that contain an undesirably high level of nitrogen-containing compounds, and in certain feeds undesirably high levels of poly-nuclear aromatic compounds, the aromatic-rich fraction is contacted with an adsorbent material prior to entering the isomerization reaction zone.

In accordance with one or more additional embodiments, a method of hydrotreating hydrocarbon feedstocks further includes flashing the hydrotreated effluent to produce a light hydrotreated effluent boiling 340° C. and below and a heavy hydrotreated effluent boiling above 340° C. Light hydrotreated effluent is recovered to fuel pool. Heavy hydrotreated effluent is separated into an aromatic-lean fraction and an aromatic-rich fraction, or recycled back to the hydrotreating reaction zone.

In accordance with one or more additional embodiments, a method of hydrotreating hydrocarbon feedstocks further includes flashing the isomerized effluent to produce a light isomerized effluent boiling 340° C. and below and a heavy isomerized effluent boiling above 340° C. Light isomerized effluent is recovered to fuel pool. Heavy isomerized effluent is separated into an aromatic-lean fraction and an aromatic-rich fraction, or recycled back to the hydrotreating reaction zone.

Figure 2:
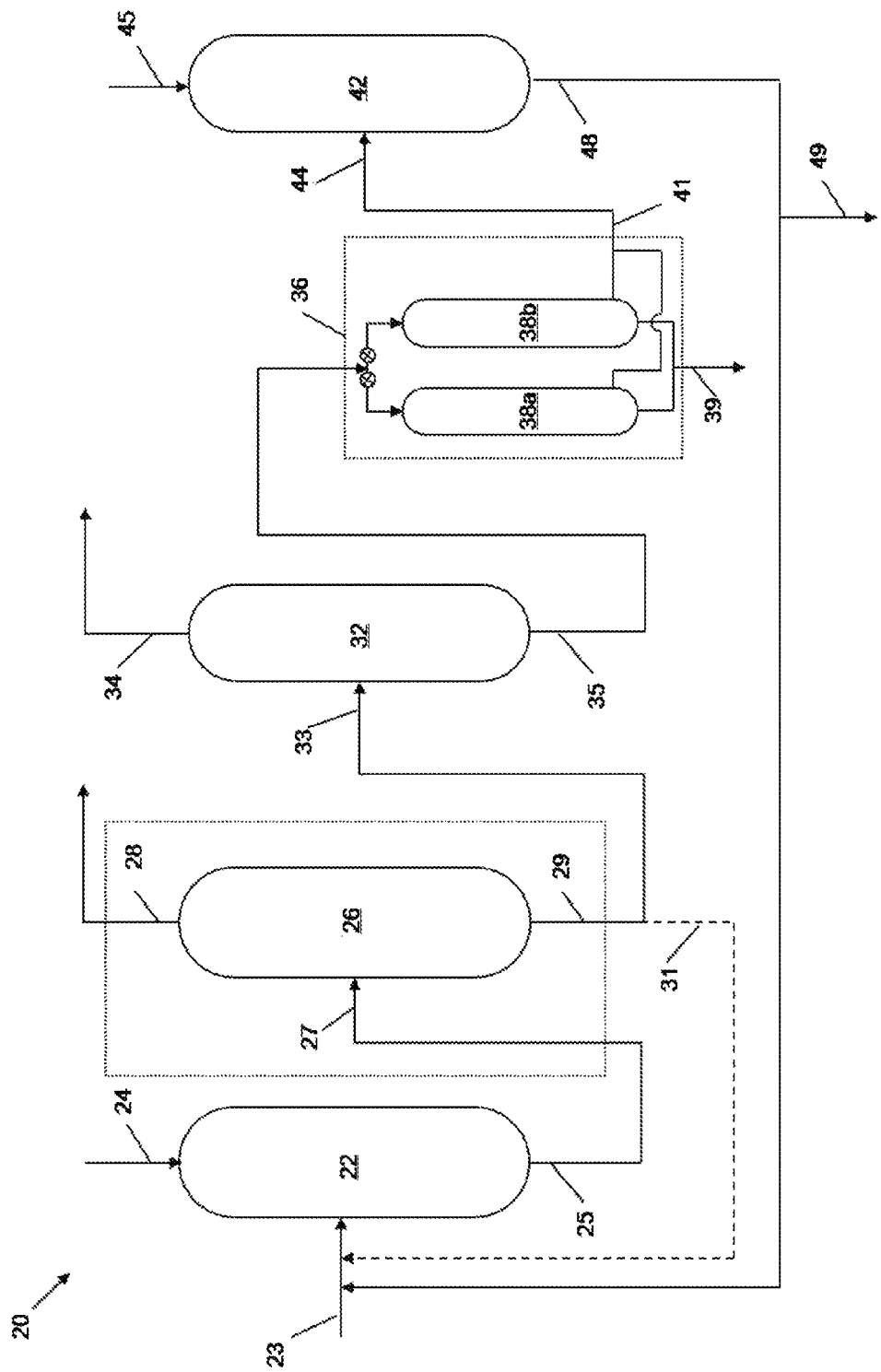
FIG. 2 is a schematic diagram of an integrated desulfurization system and process.

Referring to FIG. 2, an integrated desulfurization apparatus 20 is schematically illustrated. Apparatus 20 includes a hydrotreating or hydrodesulfurization reaction zone 22, a flashing zone 26, an aromatic separation zone 32, an adsorption zone 36 and an isomerization reaction zone 42.

Note that while the embodiment of apparatus 20 described herein includes an adsorption zone, alternative embodiments similar to apparatus 20 can be practiced without the adsorption zone. For instance, certain feedstreams can be processed which contain sufficiently low levels of nitrogen and/or polynuclear aromatic compounds such that the isomerization catalyst in isomerization reaction zone 42 is not poisoned at an unacceptable rate.

Hydrodesulfurization reaction zone 22 includes a feed inlet 23, a hydrogen gas inlet 24 and a hydrotreated effluent outlet 25. Flashing zone 26 includes an inlet 27 in fluid communication with hydrotreated effluent outlet 25, a light hydrotreated effluent outlet 28 and a heavy hydrotreated effluent outlet 29. In certain embodiments, heavy hydrotreated effluent outlet 29 is in fluid communication with inlet 23 via optional conduit 31 (as indicated by dashed lines).

Aromatic separation zone 32 includes an inlet 33 in fluid communication with heavy hydrotreated effluent outlet 29, an aromatic-lean outlet 34 and an aromatic-rich outlet 35. Various embodiments of unit operations contained within aromatic separation zone 32 are detailed further herein in conjunction with FIGS. 4-10.

Adsorption zone 36 includes inlets in selective fluid communication with aromatic-rich outlet 35, e.g., via one or more valves in a swing mode system, an outlet 41 for discharging adsorption effluent and in fluid communication with an inlet to the isomerization reaction zone 42, and a discharge stream outlet 39.

Isomerization reaction zone 42 includes an inlet 44 in fluid communication with adsorption effluent outlet 41, a hydrogen gas inlet 45 and an isomerized effluent outlet 48 in fluid communication with feed inlet 23 of the hydrodesulfurization reaction zone 22.

A hydrocarbon feedstream is introduced via inlet 23 of the hydrodesulfurization reaction zone 22 and into contact with a hydrodesulfurization catalyst and hydrogen via inlet 24. The hydrotreated effluent from outlet 25 is passed to inlet 27 of flashing zone 26 to be separated into light hydrotreated effluent boiling 340° C. and below and heavy hydrotreated effluent boiling above 340° C. Light hydrotreated effluent is conveyed to fuel pool via outlet 28. Heavy hydrotreated effluent is discharged via outlet 29 and passed to inlet 33 of the aromatic separation zone 32 to be separated into an aromatic-lean stream discharged via an aromatic-lean outlet 34 and an aromatic-rich stream discharged from an aromatic-rich outlet 35. In certain embodiments, at least a portion of heavy hydrotreated effluent is recycled back to the hydrotreating reaction zone 22 via optional conduit 31.

The aromatic-lean fraction contains a major proportion of the non-aromatic content of the heavy hydrotreated effluent and a minor proportion of the aromatic content of the heavy hydrotreated effluent. The aromatic-lean fraction is almost free of refractory sulfur- and nitrogen-containing compounds, and the aromatic-rich fraction contains sulfur- and nitrogen-containing aromatic compounds. The aromatic-lean fraction via outlet 34 can be recovered as the hydrotreated hydrocarbon product that can be blended, used as a fuel, or subjected to further downstream refinery operations.

The aromatic-rich fraction from the aromatic extraction zone 32 generally includes a major proportion of the aromatic content of the heavy hydrotreated effluent and a minor proportion of the non-aromatic content of the heavy hydrotreated effluent. Aromatic nitrogen-containing compounds that are extracted into the aromatic-rich fraction include pyrrole, quinoline, acridine, carbazole and their derivatives. Aromatic sulfur-containing compounds that are extracted into the aromatic-rich fraction include thiophene, benzothiophene and its long chain alkylated derivatives, and dibenzothiophene and its alkyl derivatives such as 4,6-dimethyl-dibenzothiophene.

The aromatic-rich fraction is conveyed to an inlet of adsorption zone 36 to reduce the concentration of certain contaminants including nitrogen-containing compounds and in certain embodiments polynuclear aromatic compounds. During an exemplary adsorption cycle, one adsorption unit 38a is adsorbing contaminants from the feed and producing treated aromatic-rich effluent stream discharged from outlet 41, while the other adsorption unit 38b is in the desorption cycle to desorb the previously adsorbed contaminants for removal in a discharge stream via an outlet 39. This discharge stream can be passed to an existing fuel oil pool, or to an existing cracking unit such as a hydrocracking unit, an FCC unit or a coking unit.

The adsorption treated aromatic-rich fraction is discharged via outlet 41 and passed to inlet 44 of the isomerization reaction zone 42 along with hydrogen via inlet 45 for isomerization reactions over an isomerization catalyst, such as an acid catalyst. Since the upstream hydrotreating unit operation was run under mild conditions, refractory sulfur-containing compounds remain in the aromatic-rich fraction of the hydrotreated effluent.

The isomerized effluent from isomerization reaction zone 42, including isomerate, unreacted hydrogen and any light gases formed in isomerization reaction zone 42, is conveyed back to the hydrodesulfurization reaction zone 22 via outlet 48. On a periodic, intermittent, semi-continuous or continuous basis, a portion of the recycle effluent from the isomerization reaction zone 42 can be removed, e.g., as a bleed stream via outlet 49. The bleed stream may be in the range of from 0 W %-50 W % of the recycle stream. The percentage of bleed stream depends on the severity of hydrotreating zone, additional flashing vessels and other operating conditions. For example, if the aromatic compounds are hydrogenated to the extent that there is no build-up of aromatic compounds in the system or the light components boiling 340° C. and below are removed by flashing zone, the bleed stream is unnecessary. The aromatic-rich bleed stream 49 can be sent to a fuel oil pool or other refinery processing units, including but not limited to hydrocracking, fluid catalytic cracking or coking.

The aromatic-lean fraction via outlet 34 can be provided with an ultra-low level of organosulfur compounds, i.e., less than 15 ppmw, and in certain embodiments less than 10 ppmw, since substantially all of the aliphatic organosulfur compounds and thiophenes are labile under mild hydrotreating conditions, and sterically hindered multi-ring aromatic organosulfur compounds such as benzothiophenes and their derivatives that were present in the initial feed were separated in the aromatic extraction zone and converted to more reactive isomers capable of being removed under mild hydrotreating conditions.

Figure 3:
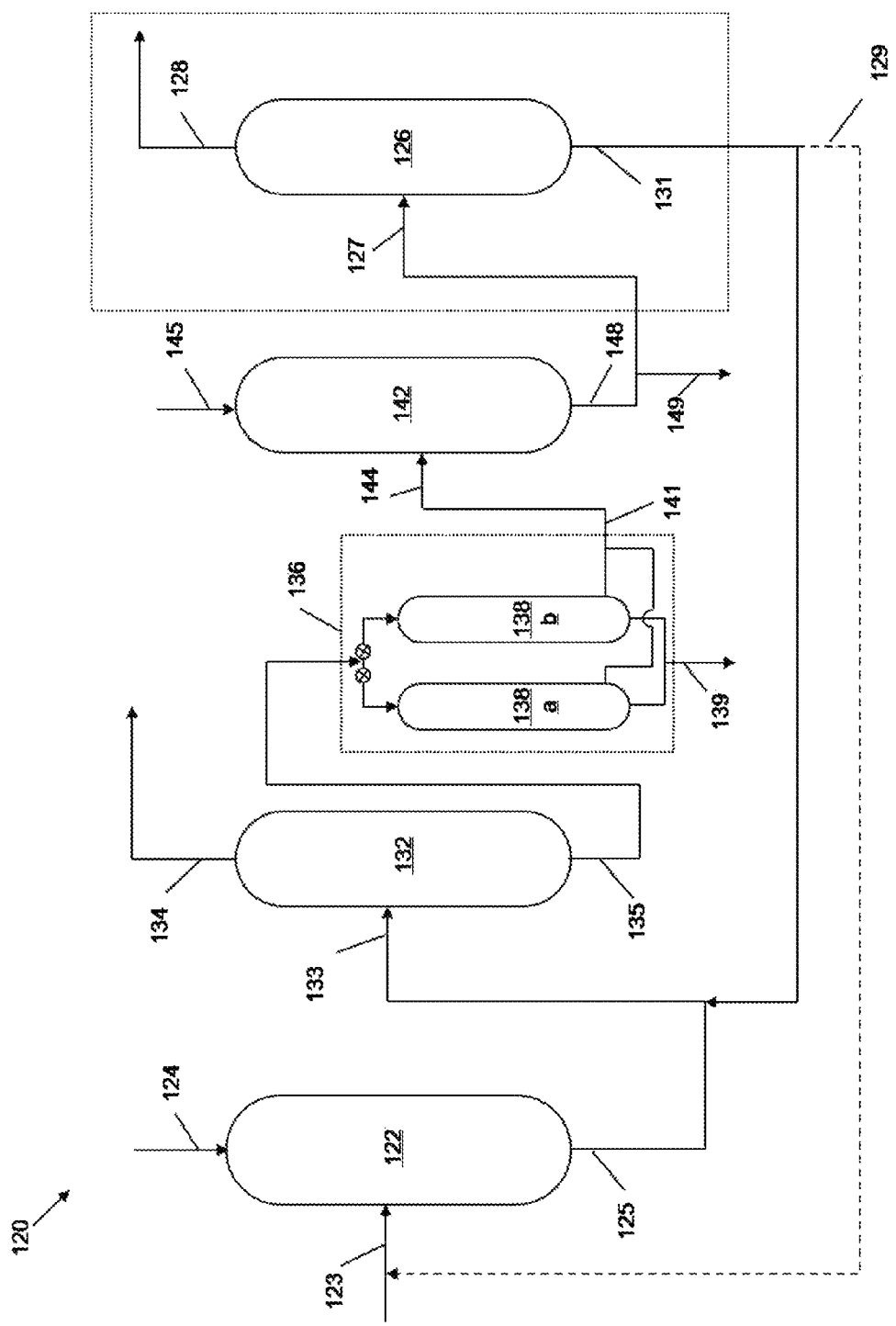
FIG. 3 is a schematic diagram of another integrated desulfurization system and process.

Referring to FIG. 3, another integrated desulfurization apparatus 120 is schematically illustrated. Apparatus 120 includes a hydrotreating or hydrodesulfurization reaction zone 122, an aromatic separation zone 132, an adsorption zone 136, an isomerization reaction zone 142 and a flashing zone 126.

Note that while the embodiment of apparatus 120 described herein includes an adsorption zone, alternative embodiments similar to apparatus 120 can be practiced without the adsorption zone. For instance, certain feedstreams can be processed which contain levels of nitrogen and/or polynuclear aromatic compounds that do not significantly poison the isomerization catalyst in isomerization reaction zone 142.

Hydrodesulfurization reaction zone 122 includes a feed inlet 123, a hydrogen gas inlet 124 and a hydrotreated effluent outlet 125. Aromatic separation zone 132 includes an inlet 133 in fluid communication with hydrotreated effluent outlet 125, an aromatic-lean outlet 134 and an aromatic-rich outlet 135. Various embodiments of unit operations contained within aromatic separation zone 132 are detailed further herein in conjunction with FIGS. 4-10.

Adsorption zone 136 includes inlets in selective fluid communication with aromatic-rich outlet 135, e.g., via one or more valves in a swing mode system, an outlet 141 for discharging adsorption effluent and a discharge stream outlet 139.

Isomerization reaction zone 142 includes an inlet 144 in fluid communication with adsorption effluent outlet 141, a hydrogen gas inlet 145 and an isomerized effluent outlet 148.

Flashing zone 126 includes an inlet 127 in fluid communication with isomerized effluent outlet 148, a light isomerized effluent outlet 128 and a heavy isomerized effluent outlet 131 in fluid communication with inlet 133 of the aromatic separation zone 132. In certain embodiments, heavy isomerized effluent outlet 131 is in fluid communication with feed inlet 123 of the hydrotreating reaction zone 122 via optional conduit 129 (as indicated by dashed lines).

A hydrocarbon feedstream is introduced via inlet 123 of the hydrodesulfurization reaction zone 122 and into contact with a hydrodesulfurization catalyst and hydrogen via inlet 124. The hydrotreated effluent from outlet 125 is passed to the aromatic separation zone 132 to be separated into an aromatic-lean stream discharged via an aromatic-lean outlet 134 and an aromatic-rich stream discharged from an aromatic-rich outlet 135.

The aromatic-lean fraction contains a major proportion of the non-aromatic content of the hydrotreated effluent and a minor proportion of the aromatic content of the hydrotreated effluent. The aromatic-lean fraction via outlet 134 can be recovered as the hydrotreated hydrocarbon product that can be blended, used as a fuel, or subjected to further downstream refinery operations.

The aromatic-rich fraction from the aromatic extraction zone 132 generally includes a major proportion of the aromatic content of the hydrotreated effluent and a minor proportion of the non-aromatic content of the hydrotreated effluent. The aromatic-rich fraction is conveyed to an inlet of adsorption zone 136 to reduce the concentration of certain contaminants including nitrogen-containing compounds and in certain embodiments poly-nuclear aromatic compounds.

The adsorption treated aromatic-rich fraction is discharged via outlet 141 and passed to inlet 144 of the isomerization reaction zone 142 along with hydrogen via inlet 145 for isomerization reactions over an isomerization catalyst, such as an acid catalyst. Since the upstream hydrotreating unit operation was run under mild conditions, refractory sulfur-containing compounds remain in the aromatic-rich fraction of the hydrotreated effluent.

The effluent from isomerization reaction zone 142, including isomerate, unreacted hydrogen and any light gases formed in isomerization reaction zone 142, is passed to inlet 127 of flashing zone 126 to be separated into light isomerized effluent boiling 340° C. and below and heavy isomerized effluent boiling above 340° C. Light isomerized effluent is conveyed to fuel pool via outlet 128. Heavy isomerized effluent is passed to inlet 133 of the aromatic separation zone 132. In certain embodiments, at least a portion of heavy isomerized effluent is recycled back to the hydrotreating reaction zone 122 via optional conduit 129.

On a periodic, intermittent, semi-continuous or continuous basis, a portion of the recycle effluent from the isomerization reaction zone 142 can be removed, e.g., as a bleed stream via outlet 149. The bleed stream may be in the range of from 0 W %-50 W % of the recycle stream. The percentage of bleed stream depends on the severity of hydrotreating zone, additional flashing vessels and other operating conditions. For example, if the aromatic compounds are hydrogenated to the extent that there is no build-up of aromatic compounds in the system or the light components boiling 340° C. and below are removed by flashing zone, the bleed stream is unnecessary. The aromatic-rich bleed stream 149 can be sent to a fuel oil pool or other refinery processing units, including but not limited to hydrocracking, fluid catalytic cracking or coking.

The resulting aromatic-lean fraction via outlet 134 contains an ultra-low level of organosulfur compounds, i.e., less than 15 ppmw, and in certain embodiments less than 10 ppmw, since substantially all of the aliphatic organosulfur compounds and thiophenes are labile under mild hydrotreating conditions, and sterically hindered multi-ring aromatic organosulfur compounds such as benzothiophenes and their derivatives that were present in the initial feed were converted to more reactive isomers that can be removed under mild hydrotreating conditions.

The initial feedstock for use in above-described apparatus and process can be a crude or partially refined oil product obtained from various sources. The source of feedstock can be crude oil, synthetic crude oil, bitumen, oil sand, shale oil, coal liquids, or a combination including one of the foregoing sources. For example, the feedstock can be a straight run gas oil or other refinery intermediate stream such as vacuum gas oil, deasphalted oil and/or demetalized oil obtained from a solvent deasphalting process, light coker or heavy coker gas oil obtained from a coker process, cycle oil obtained from an FCC process, gas oil obtained from a visbreaking process, or any combination of the foregoing products. In certain embodiments, a suitable hydrocarbon feedstock is a straight run gas oil, a middle distillate fraction, or a diesel fraction, boiling in the range of from about 180° C. to about 450° C., in certain embodiments about 180° C. to about 400° C., and in further embodiments about 180° C. to about 370° C., typically containing up to about 2 W % sulfur and up to about 3,000 ppmw nitrogen. Nonetheless, one of ordinary skill in the art will appreciate that other hydrocarbon streams can benefit from the practice of the herein described system and method.

The hydrodesulfurization reaction zone can be operated under mild conditions since sterically hindered sulfur-containing compounds are generally not targeted in this zone in the present process. As used herein, "mild" operating conditions are relative and the range of operating conditions depend on the feedstock being processed. These conditions are generally an operating temperature of 400° C. and below, a hydrogen partial pressure of 40 bars and below, and a hydrogen feed rate of 500 standard liters of hydrogen per liter of oil (SLt/Lt) and below. In certain embodiments of the process described herein, these mild operating conditions as used in conjunction with hydrotreating a mid-distillate stream, i.e., boiling in the range of from about 180° C. to about 370° C., include: a temperature in the range of from about 300° C. to about 400° C., and in certain embodiments about 320° C. to about 380° C.; a reaction pressure in the range of from about 20 bars to about 100 bars, and in certain embodiments about 30 bars to about 60 bars; a hydrogen partial pressure of below about 55 bars, and in certain embodiments in the range of from about 20 bars to about 40 bars; a liquid hourly space velocity (LHSV) feed rate in the range of from about 0.5 $h^{-1}$ to about 10 $h^{-1}$, and in certain embodiments about 1.0 $h^{-1}$ to about 4 $h^{-1}$; and a hydrogen feed rate in the range of from about 100 SLt/Lt to about 500 SLt/Lt, in certain embodiments about 100 SLt/Lt to about 300 SLt/Lt, and in additional embodiments about 100 SLt/Lt to about 200 SLt/Lt.

The hydrodesulfurization reaction zone utilizes hydrodesulfurizing catalyst having one or more active metal components selected from the Periodic Table of the Elements Group VI, VII or VIIIB. In certain embodiments the active metal component is one or more of cobalt, nickel, tungsten and molybdenum, typically deposited or otherwise incorporated on a support, e.g., alumina, silica alumina, silica, or zeolites. In certain embodiments, the hydrotreating catalyst used in the first hydrotreating zone, i.e., operating under mild conditions, includes a combination of cobalt and molybdenum deposited on an alumina substrate.

The acid catalyst of isomerization zone contains a solid acidic component having high acidity in terms of quantity and strength. While a range of acidity levels can be used to achieve the desired isomerization reactions, use of solid acid catalysts with higher acidity promotes undesirable cracking of hydrocarbons, particularly under elevated temperature conditions in isomerization reaction zone. It is noted that while quantitative measures for the acidity levels of catalysts vary, a suitable characterization that can be used is described in Hansford et al., "The Nature of Active Sites on Zeolites, VII. Relative Activities of Crystalline and Amorphous Alumino-Silicates," *Journal of Catalysis*, 1969, 13, 316-320, which is incorporated by reference herein. Briefly, the Hansford et al. reference describes a method to determine the rate constants for o-xylene isomerization to p-xylene and xylene at 260° C. An acidity scale based on the relative first order rate constants was determined. While an in depth discussion is beyond the scope of the present description, the isomerization catalyst for use herein should possess an acidity of at least 15 times more than the acidity of amorphous silica-alumina catalyst at a temperature of 260° C. as determined from the isomerization test detailed in Hansford et al. For example, the rate constant for isomerization at 260° C. of o-xylene over silica alumina catalysts is 3.1, and the rate constant over HY zeolite is 48.8, thus the relative acidity of HY zeolite compared to silica alumina is 48.8/3.1, or 15.7.

Particular solid acid catalysts include one or more of zeolites, molecular sieves, crystalline or amorphous aluminosilicates, aluminophosphates, silicoaluminophosphates, sulfated zirconia, tungstated zirconia, niobic acid, supported heteropolyacids or derivatives thereof, or bulk heteropolyacids or derivatives thereof. In certain embodiments, effective solid acidic components include one or more zeolites or molecular sieves.

In addition, one or more solid acid components, for instance, as noted above, can be combined with a suitable porous binder or matrix material in a ratio of solid acid to binder of less than about 15:1, in certain embodiments less than about 10:1, in additional embodiments less than about 5:1, and in further embodiments about 2:1. The binder or matrix material can be selected from one or more of active and inactive materials such as clays (e.g., montmorillonite and kaolin), silica, and/or metal oxides such as alumina. In certain embodiments, the porous matrix or binder material includes silica, alumina, or kaolin clay. In additional embodiments, an alumina binder material is used.

The isomerization reaction zone can include one or more reactors or reaction zones with one or more catalyst beds of the same or different isomerization catalyst. In certain embodiments, fixed bed reactors are employed. In other embodiments, fluidized beds, ebullating beds, slurry beds, and moving beds can be used.

The isomerization reaction zone is operated under suitable conditions to isomerize at least a portion of the alkyl groups present in sterically hindered sulfur-containing compounds to form more reactive sulfur-containing compound. Targeted sulfur-containing compounds include 4,6-dimethyl-dibenzothiophene. These sterically hindered compounds are typically not desulfurized in hydrotreating reactors under mild conditions. Isomerization reaction zone conditions include temperatures of about 100° C. to about 400° C., in certain embodiments about 150° C. to about 350° C., and in further embodiments about 200° C. to about 300° C.; pressures of about 1 bar to about 80 bars, in certain embodiments about 1 bar to about 50 bars, and in further embodiments about 1 bar to about 30 bars; liquid hourly space velocities of about 0.5 $h^{-1}$ to about 8 $h^{-1}$, in certain embodiments about 0.5 $h^{-1}$ to about 5 $h^{-1}$, and in further embodiments about 0.5 $h^{-1}$ to about 2 $h^{-1}$; and a hydrogen feed rate of about 100 SLt/Lt to about 1000 SLt/Lt, in certain embodiments about 100 SLt/Lt to about 500 SLt/Lt, in further embodiments about 100 SLt/Lt to about 200 SLt/Lt.

The adsorption zone can include plural packed columns as adsorption units such that swing-mode adsorption occurs as is known to one of ordinary skill in the art. During an adsorption cycle, one adsorption unit is adsorbing contaminants from the feed and producing treated aromatic-rich effluent stream, while the other adsorption is in the desorption cycle to desorb the previously adsorbed contaminants for removal in a discharge stream (via an outlet 39 or 139). This discharge stream can be passed to an existing fuel oil pool, or to an existing cracking unit such as a hydrocracking unit, an FCC unit or a coking unit. When the adsorbent material in one column becomes saturated with adsorbed contaminants, the flow of the combined feedstream is directed to the other column. The adsorbed compounds are desorbed by heat or solvent treatment.

In case of heat desorption, heat is applied, for instance, with an inert nitrogen gas flow to the desorbed adsorption column. The desorbed compounds are removed from the adsorption columns.

In the case of solvent desorption, fresh or recycled solvent is introduced to the adsorption zone. The solvent stream containing removed nitrogen-containing compounds and/or poly-nuclear aromatic compounds is discharged from adsorption zone, and solvent can be recovered using flash or distillation separation.

Nitrogen-containing compounds and in certain embodiments poly-nuclear aromatic compounds are removed in adsorption zone to increase the useful lifetime of the isomerization catalysts. For instance, basic nitrogen-containing compounds are removed as they tend to poison the acidic isomerization catalysts. Examples of these basic nitrogen-containing compounds targeted in the adsorption zone include acridines, quinolines, anilines, quinoline, indole, carbazole, quinolin-2(1H)-one, and derivatives of any of the foregoing. In addition, other bulky nitrogen-containing compounds and any poly-nuclear aromatic compounds tend to fill in the adsorption sites, particularly at the relatively low temperature reaction conditions during isomerization reactions.

Basic nitrogen compounds have a tendency to strongly adsorb on the surface and in the pores of the isomerization catalyst. While desorption of these compounds is possible in the isomerization reaction zone, the reaction conditions during isomerization reactions, i.e., relatively low temperature, is less than that required to promote desorption of the nitrogen compounds during reaction, and hence they will "poison" the catalysts under isomerization reaction conditions. Aromatics, such as single ring and polynuclear aromatics including those having 2-4 rings and in hydrocarbon streams approximately at the diesel fraction, adsorb on the isomerization catalyst surface, but are less adsorptive than equivalent aromatic-content nitrogen compounds. That is, the relative adsorption coefficient for aromatic nitrogen-containing compounds is much higher than that of equivalent weight aromatic hydrocarbons. For instance, acridine (a three-ring nitrogen-containing aromatic-ring compound) has a ratio of adsorption constant value of 34 compared to anthracene (a three ring aromatic molecule without nitrogen heteroatoms) with a ratio of adsorption constant value of 0.

Adsorption conditions include temperatures of about 20° C. to about 400° C., in certain embodiments about 20° C. to about 300° C., and in further embodiments about 20° C. to about 200° C.; pressures of about 1 bar to about 50 bars, in certain embodiments about 1 bar to about 30 bars, and in further embodiments about 1 bar to about 10 bars; and liquid hourly space velocities of about 0.1 $h^{-1}$ to about 20 $h^{-1}$, in certain embodiments about 0.5 $h^{-1}$ to about 10 $h^{-1}$, and in further embodiments about 1.0 $h^{-1}$ to about 4 $h^{-1}$.

Suitable adsorbent materials include clays, synthetic zeolite, spent or regenerated refinery catalyst, activated carbon, silica-alumina, titania, porous ion-exchange resins or any material containing acidic sites. In certain embodiments, the solid adsorbent materials include silica, alumina, silica alumina, clay, or activated carbon.

The aromatic separation apparatus is generally based on selective aromatic extraction. For instance, the aromatic separation apparatus can be a suitable solvent extraction aromatic separation apparatus capable of partitioning the hydrotreated effluent into a generally aromatic-lean stream and a generally aromatic-rich stream. Systems including various established aromatic extraction processes and unit operations used in other stages of various refinery and other petroleum-related operations can be employed as the aromatic separation apparatus described herein. In certain existing processes, it is desirable to remove aromatics from the end product, e.g., lube oils and certain fuels, e.g., diesel fuel. In other processes, aromatics are extracted to produce aromatic-rich products, for instance, for use in various chemical processes and as an octane booster for gasoline.

Figure 4:
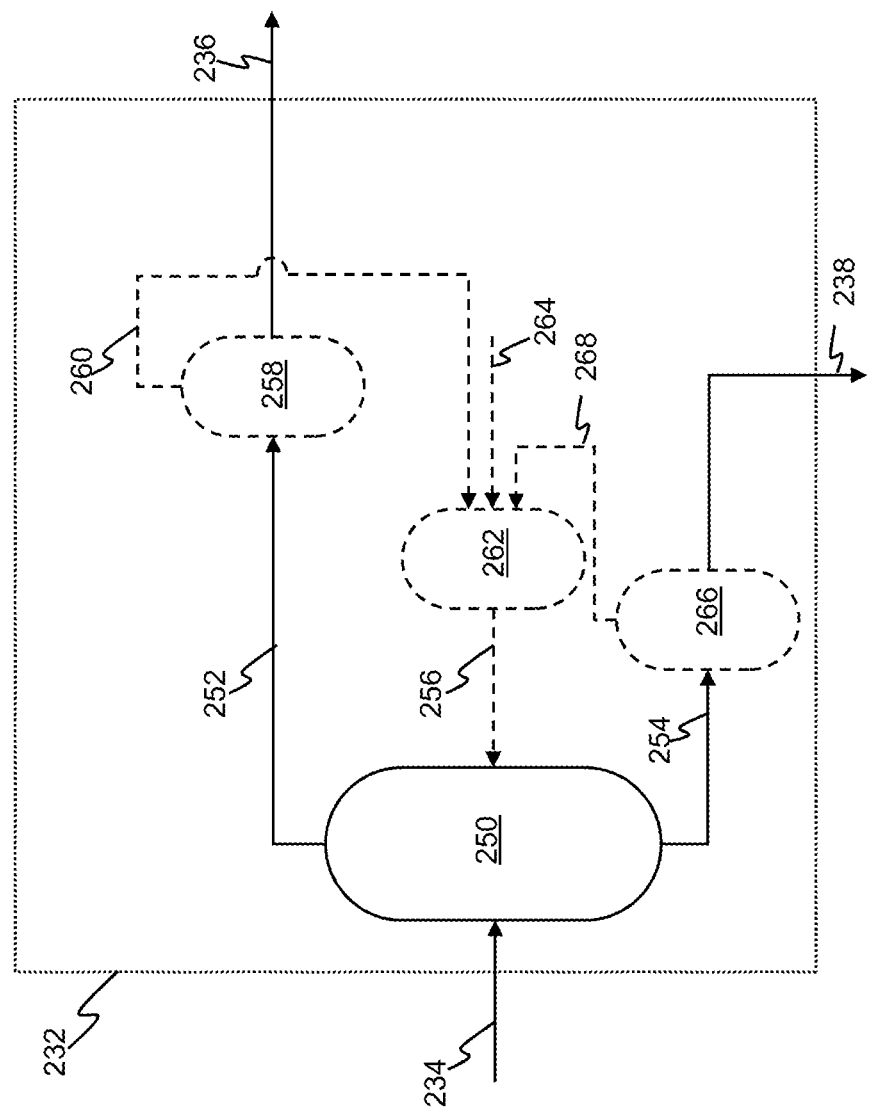
FIG. 4 is a schematic diagram of an aromatic separation zone.

As shown in FIG. 4, an aromatic separation apparatus 232 can include suitable unit operations to perform a solvent extraction of aromatics, and recover solvents for reuse in the process. Hydrotreated effluent 234 is conveyed to an aromatic extraction vessel 250 in which an aromatic-lean fraction is separated as a raffinate stream 252 from an aromatic-rich fraction as an extract stream 254. A solvent feed 256 is introduced into aromatic extraction vessel 250.

A portion of the extraction solvent can also exist in stream 252, e.g., in the range of from about 0 W % to about 15 W % (based on the total amount of stream 252), in certain embodiments less than about 8 W %. In operations in which the solvent existing in stream 252 exceeds a desired or predetermined amount, solvent can be removed from the hydrocarbon product, for example, using a flashing or stripping unit 258, or other suitable apparatus. Solvent 260 from a flashing unit 258 can be recycled to the aromatic extraction vessel 250, e.g., via a surge drum 262. Initial solvent feed or make-up solvent can be introduced via stream 264. An aromatic-lean stream 236 is discharged from the flashing unit 258.

In addition, a portion of the extraction solvent can also exist in stream 254, e.g., in the range of from about 70 W % to about 98 W % (based on the total amount of stream 254), in certain embodiments less than about 85 W %. In embodiments in which solvent existing in stream 254 exceeds a desired or predetermined amount, solvent can be removed from the hydrocarbon product, for example, using a flashing or stripping unit 266 or other suitable apparatus. Solvent 268 from the flashing unit 266 can be recycled to the aromatic extraction vessel 250, e.g., via the surge drum 262. An aromatic-rich stream 238 is discharged from the flashing unit 266.

Selection of solvent, operating conditions, and the mechanism of contacting the solvent and hydrotreated effluent permit control over the level of aromatic extraction. For instance, suitable solvents include furfural, N-methyl-2-pyrrolidone, dimethylformamide, dimethylsulfoxide, phenol, nitrobenzene, sulfolanes, acetonitrile, furfural, or glycols, and can be provided in a solvent to oil ratio of about 20:1, in certain embodiments about 4:1, and in further embodiments about 1:1. Suitable glycols include diethylene glycol, ethylene glycol, triethylene glycol, tetraethylene glycol and dipropylene glycol. The extraction solvent can be a pure glycol or a glycol diluted with from about 2 to 10 W % water. Suitable sulfolanes include hydrocarbon-substituted sulfolanes (e.g., 3-methyl sulfolane), hydroxysulfolanes (e.g., 3-sulfolanol and 3-methyl-4-sulfolanol), sulfolanyl ethers (i.e., methyl-3-sulfolanyl ether), and sulfolanyl esters (e.g., 3-sulfolanyl acetate).

The aromatic separation apparatus can operate at a temperature in the range of from about 20° C. to about 200° C., and in certain embodiments about 40° C. to about 80° C. The operating pressure of the aromatic separation apparatus can be in the range of from about 1 bar to about 10 bars, and in certain embodiments, about 1 bar to 3 bars. Types of apparatus useful as the aromatic separation apparatus in certain embodiments of the system and process described herein include stage-type extractors or differential extractors.

Figure 5:
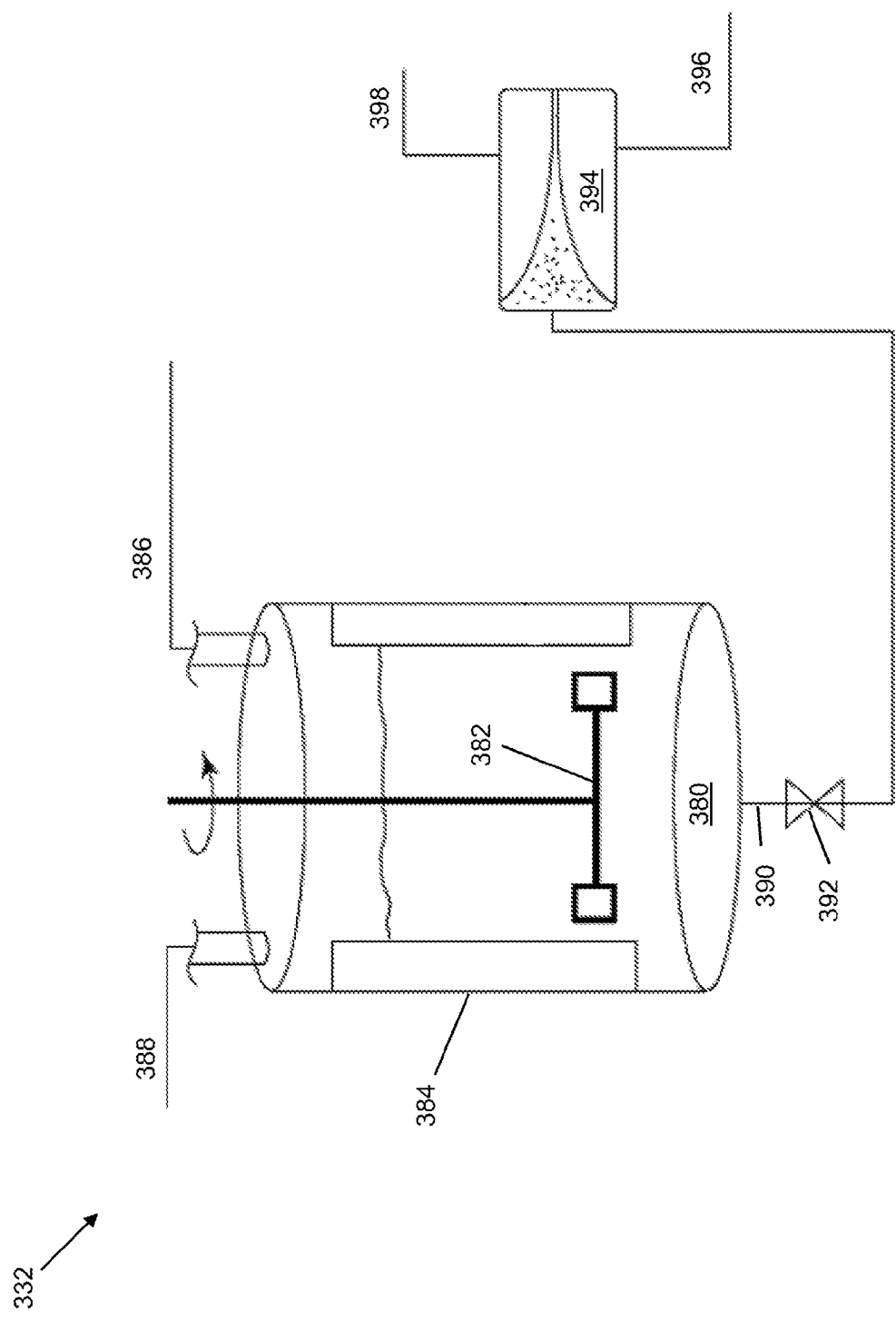

An example of a stage-type extractor is a mixer-settler apparatus 332 schematically illustrated in FIG. 5. Mixer-settler apparatus 332 includes a vertical tank 380 incorporating a turbine or a propeller agitator 382 and one or more baffles 384. Charging inlets 386, 388 are located at the top of tank 380 and outlet 390 is located at the bottom of tank 380. The feedstock to be extracted is charged into vessel 380 via inlet 386 and a suitable quantity of solvent is added via inlet 388. The agitator 382 is activated for a period of time sufficient to cause intimate mixing of the solvent and charge stock, and at the conclusion of a mixing cycle, agitation is halted and, by control of a valve 392, at least a portion of the contents are discharged and passed to a settler 394. The phases separate in the settler 394 and a raffinate phase containing an aromatic-lean hydrocarbon mixture and an extract phase containing an aromatic-rich mixture are withdrawn via outlets 396 and 398, respectively. In general, a mixer-settler apparatus can be used in batch mode, or a plurality of mixer-settler apparatus can be staged to operate in a continuous mode.

Another stage-type extractor is a centrifugal contactor. Centrifugal contactors are high-speed, rotary machines characterized by relatively low residence time. The number of stages in a centrifugal device is usually one, however, centrifugal contactors with multiple stages can also be used. Centrifugal contactors utilize mechanical devices to agitate the mixture to increase the interfacial area and decrease the mass transfer resistance.

Various types of differential extractors (also known as "continuous contact extractors") that are also suitable for use as an aromatic extraction apparatus in zone 32 or 132 include, but are not limited to, centrifugal contactors and contacting columns such as tray columns, spray columns, packed towers, rotating disc contactors and pulse columns.

Contacting columns are suitable for various liquid-liquid extraction operations. Packing, trays, spray or other droplet-formation mechanisms or other apparatus are used to increase the surface area in which the two liquid phases (i.e., a solvent phase and a hydrocarbon phase) contact, which also increases the effective length of the flow path. In column extractors, the phase with the lower viscosity is typically selected as the continuous phase, which, in the case of an aromatic extraction apparatus, is the solvent phase. In certain embodiments, the phase with the higher flow rate can be dispersed to create more interfacial area and turbulence. This is accomplished by selecting an appropriate material of construction with the desired wetting characteristics. In general, aqueous phases wet metal surfaces and organic phases wet non-metallic surfaces. Changes in flows and physical properties along the length of an extractor can also be considered in selecting the type of extractor and/or the specific configuration, materials or construction, and packing material type and characteristics (i.e., average particle size, shape, density, surface area, and the like).

Figure 6:
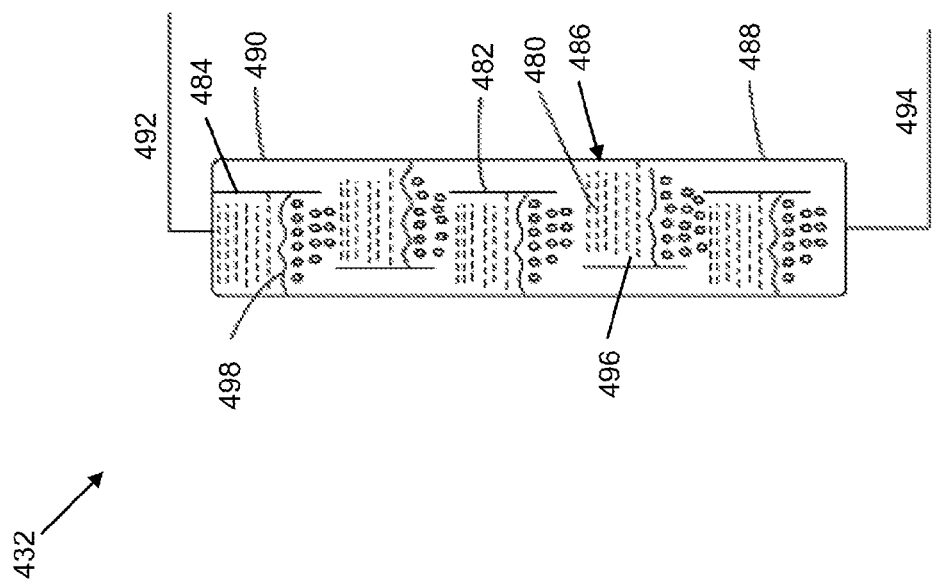

A tray column 432 is schematically illustrated in FIG. 6. A light liquid inlet 488 at the bottom of column 432 receives liquid hydrocarbon, and a heavy liquid inlet 490 at the top of column 432 receives liquid solvent. Column 432 includes a plurality of trays 480 and associated downcomers 482. A top level baffle 484 physically separates incoming solvent from the liquid hydrocarbon that has been subjected to prior extraction stages in the column 432. Tray column 432 is a multi-stage counter-current contactor. Axial mixing of the continuous solvent phase occurs at region 486 between trays 480, and dispersion occurs at each tray 480 resulting in effective mass transfer of solute into the solvent phase. Trays 480 can be sieve plates having perforations ranging from about 1.5 to 4.5 mm in diameter and can be spaced apart by about 150-600 mm.

Light hydrocarbon liquid passes through the perforation in each tray 480 and emerges in the form of fine droplets. The fine hydrocarbon droplets rise through the continuous solvent phase and coalesce into an interface layer 496 and are again dispersed through the tray 480 above. Solvent passes across each plate and flows downward from tray 480 above to the tray 480 below via downcomer 482. The principle interface 498 is maintained at the top of column 432. Aromatic-lean hydrocarbon liquid is removed from outlet 492 at the top of column 432 and aromatic-rich solvent liquid is discharged through outlet 494 at the bottom of column 432. Tray columns are efficient solvent transfer apparatus and have desirable liquid handling capacity and extraction efficiency, particularly for systems of low-interfacial tension.

Figure 7:
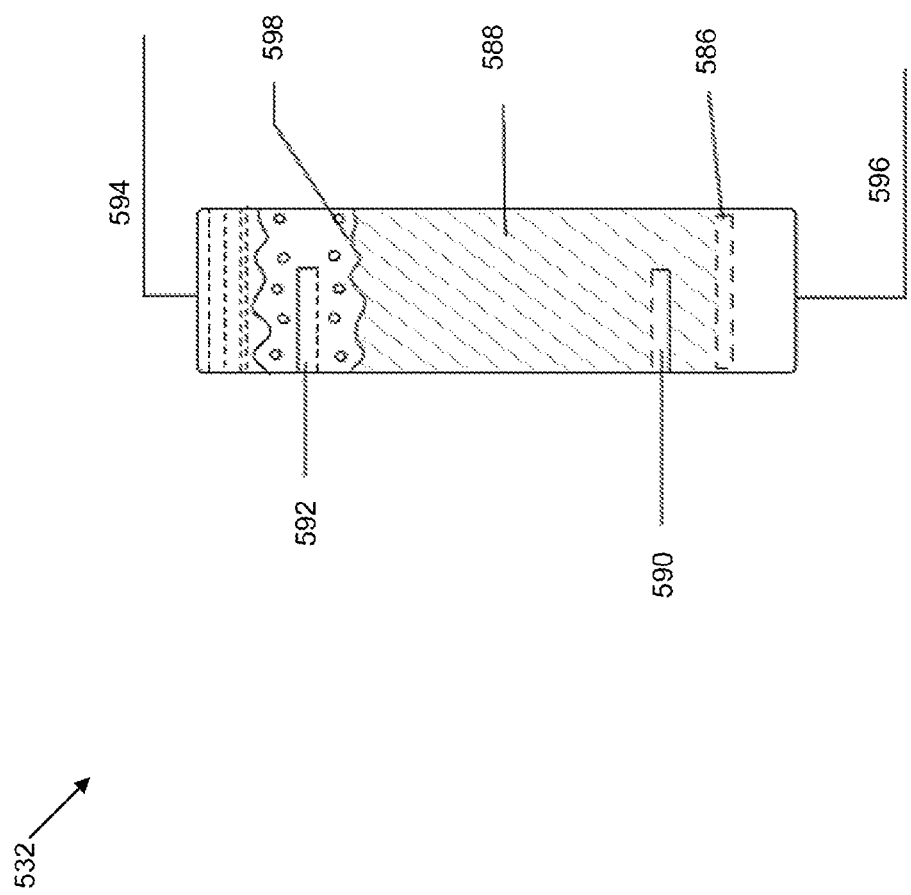

An additional type of unit operation suitable for extracting aromatics from the hydrocarbon feed is a packed bed column. FIG. 7 is a schematic illustration of a packed bed column 532 having a hydrocarbon inlet 590 and a solvent inlet 592. A packing region 588 is provided upon a support plate 586. Packing region 588 comprises suitable packing material including, but not limited to, Pall rings, Raschig rings, Kascade rings, Intalox saddles, Berl saddles, super Intalox saddles, super Berl saddles, Demister pads, mist eliminators, telerrettes, carbon graphite random packing, other types of saddles, and the like, including combinations of one or more of these packing materials. The packing material is selected so that it is fully wetted by the continuous solvent phase. The solvent introduced via inlet 592 at a level above the top of the packing region 588 flows downward and wets the packing material and fills a large portion of void space in the packing region 588. Remaining void space is filled with droplets of the hydrocarbon liquid which rise through the continuous solvent phase and coalesce to form the liquid-liquid interface 598 at the top of the packed bed column 532. Aromatic-lean hydrocarbon liquid is removed from outlet 594 at the top of column 532 and aromatic-rich solvent liquid is discharged through outlet 596 at the bottom of column 532. Packing material provides large interfacial areas for phase contacting, causing the droplets to coalesce and reform. The mass transfer rate in packed towers can be relatively high because the packing material lowers the recirculation of the continuous phase.

Figure 8:
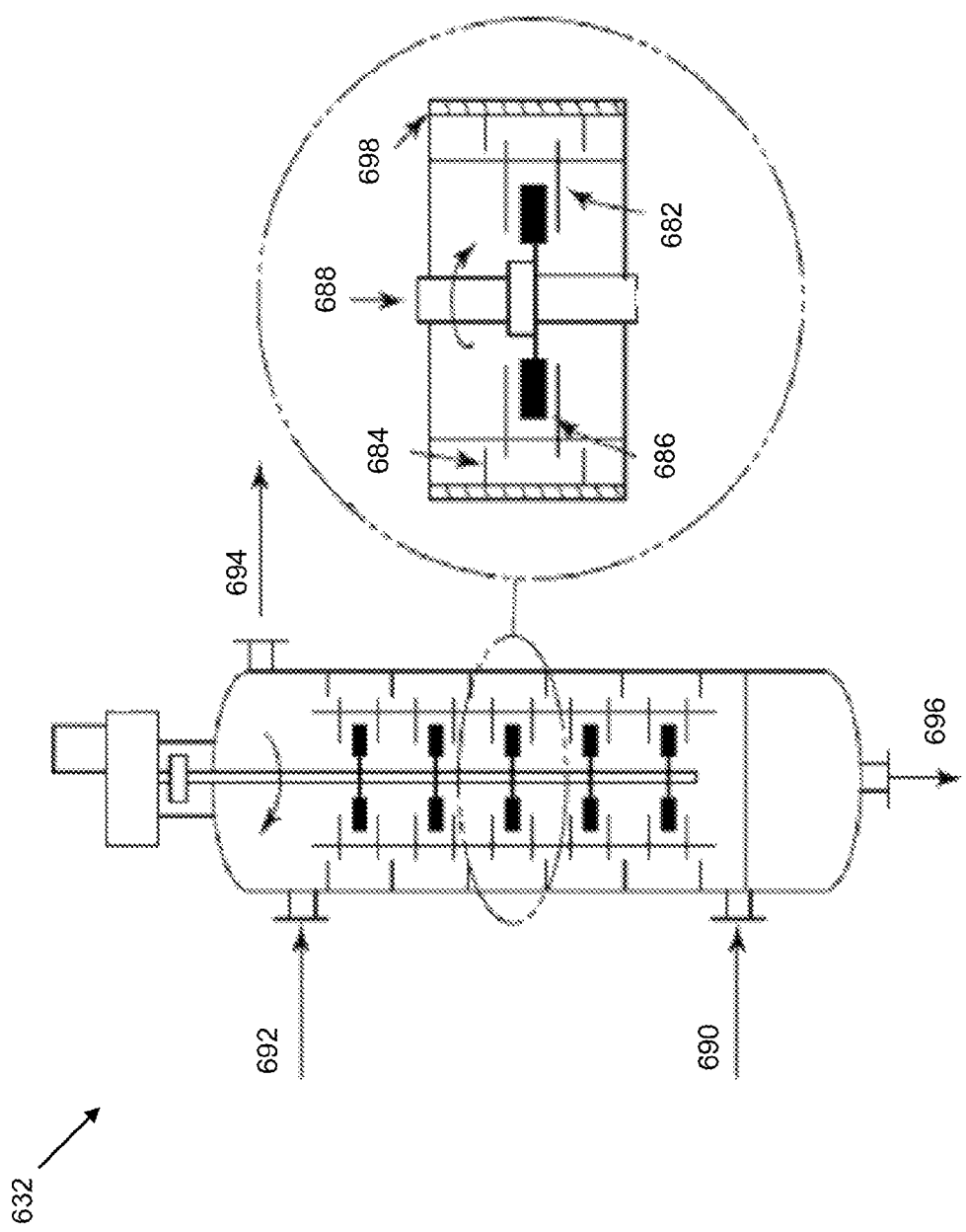

Further types of apparatus suitable for aromatic extraction in the system and method herein include rotating disc contactors. FIG. 8 is a schematic illustration of a rotating disc contactor 632 known as a Scheiebel® column commercially available from Koch Modular Process Systems, LLC of Paramus, N.J., USA. It will be appreciated by those of ordinary skill in the art that other types of rotating disc contactors can be implemented as an aromatic extraction unit included in the system and method herein, including but not limited to Oldshue-Rushton columns, and Kuhni extractors. The rotating disc contactor is a mechanically agitated, counter-current extractor. Agitation is provided by a rotating disc mechanism, which typically runs at much higher speeds than a turbine type impeller as described with respect to FIG. 5.

Rotating disc contactor 632 includes a hydrocarbon inlet 690 toward the bottom of the column and a solvent inlet 692 proximate the top of the column, and is divided into number of compartments formed by a series of inner stator rings 682 and outer stator rings 684. Each compartment contains a centrally located, horizontal rotor disc 686 connected to a rotating shaft 688 that creates a high degree of turbulence inside the column. The diameter of the rotor disc 686 is slightly less than the opening in the inner stator rings 682. Typically, the disc diameter is 33-66% of the column diameter. The disc disperses the liquid and forces it outward toward the vessel wall 698 where the outer stator rings 684 create quiet zones where the two phases can separate. Aromatic-lean hydrocarbon liquid is removed from outlet 694 at the top of column 632 and aromatic-rich solvent liquid is discharged through outlet 696 at the bottom of column 632. Rotating disc contactors advantageously provide relatively high efficiency and capacity and have relatively low operating costs.

An additional type of apparatus suitable for aromatic extraction in the system and method herein is a pulse column. FIG. 9 is a schematic illustration of a pulse column system 732, which includes a column with a plurality of packing or sieve plates 788, a light phase, i.e., solvent, inlet 790, a heavy phase, i.e., hydrocarbon feed, inlet 792, a light phase outlet 794 and a heavy phase outlet 796.

In general, pulse column system 732 is a vertical column with a large number of sieve plates 788 lacking down comers. The perforations in the sieve plates 788 typically are smaller than those of non-pulsating columns, e.g., about 1.5 mm to 3.0 mm in diameter.

A pulse-producing device 798, such as a reciprocating pump, pulses the contents of the column at frequent intervals. The rapid reciprocating motion, of relatively small amplitude, is superimposed on the usual flow of the liquid phases. Bellows or diaphragms formed of coated steel (e.g., coated with polytetrafluoroethylene), or any other reciprocating, pulsating mechanism can be used. A pulse amplitude of 5-25 mm is generally recommended with a frequency of 100-260 cycles per minute. The pulsation causes the light liquid (solvent) to be dispersed into the heavy phase (oil) on the upward stroke and heavy liquid phase to jet into the light phase on the downward stroke. The column has no moving parts, low axial mixing, and high extraction efficiency.

A pulse column typically requires less than a third the number of theoretical stages as compared to a non-pulsating column. A specific type of reciprocating mechanism is used in a Karr Column which is shown in FIG. 10.

The addition of an aromatic separation zone into hydrotreating and isomerization reaction apparatus and processes described herein uses relatively low cost units as well as more favorable operating conditions in the mild hydrodesulfurization zone, i.e., milder pressure and temperature and reduced hydrogen consumption. Only the aromatic-rich fraction is subjected to the isomerization reactions to convert the sterically hindered sulfur-containing compounds. This results in more cost-effective desulfurization of hydrocarbon fuels, particularly removal of the refractory, sterically hindered sulfur-containing compounds, thereby efficiently and economically achieving ultra-low sulfur content fuel products.

Distinct advantages are offered by the integrated hydrotreating and isomerization reaction apparatus and processes described herein when compared to conventional processes for deep desulfurization of hydrocarbon fuel. For example, in certain conventional approaches to deep desulfurization, the entire hydrocarbon stream undergoes isomerization, requiring unit operations of a capacity suitable for the full feedstream. Furthermore, undesired side reactions during isomerization reactions that can negatively impact certain desired fuel characteristics are avoided for a portion of the initial feed. In addition, in embodiments in which an adsorption zone is required, operating costs associated with the adsorption of nitrogen-containing and polynuclear aromatic compounds from the entire feedstream are decreased as only the aromatic-rich portion of the initial feed is subjected to adsorption.

As the herein described example demonstrates, very low severity hydrotreating operating conditions can be applied yet the product still contains less than 10 ppmw sulfur compounds. By separating hydrotreated effluent into an aromatic-rich fraction and an aromatic-lean fraction, and treating the aromatic-rich fraction containing refractory sulfur compounds in isomerization step, the hydrotreating unit can be operated under very mild conditions, i.e. hydrogen partial pressures of less than 30 bars, liquid hourly space velocity of 1 $h^{-1}$ and hydrogen feed rate of 300 SLt/Lt. If the same feedstock is to be treated in a single hydrotreating unit, the pressure and/or catalyst volume must be increased to achieve desulfurization levels as shown herein. For example, a hydrotreating pilot plant study conducted with gas oil derived from Arab light crude oil at 30 bars of hydrogen partial pressure and 350° C., showed the relative catalyst requirement for 500 ppmw and 10 ppmw sulfur gas oil products to be 1 and 4.9, respectively.

EXAMPLE

An apparatus was constructed including various unit operations and streams in an arrangement similar to that described with respect to FIG. 2, therefore corresponding reference numbers are used.

A straight run gas oil stream derived from Arab heavy crude oils, the properties of which are given in Table 1, was hydrotreated in a hydrotreating reaction zone.

TABLE 1

Properties of Arab Heavy Straight Run Gas Oil

| Property | Methods | Units | Value |
|---|---|---|---|
| Stream # | | | 24 |
| Density @ 15.6° C. | ASTM D4052 | Kg/Lt | 0.8346 |
| SULFUR | ASTM D4294 | W % | 1.1717 |
| NITROGEN | | ppmw | 33.5 |
| Hydrogen | | W % | 13.47 |
| Aromatics | | W % | 29.1 |
| Parafiins + Naphthenes | | W % | 70.9 |
| IBP | ASTM D2887 | ° C. | 149 |
| 5 W % | ASTM D2887 | ° C. | 175 |
| 10 W % | ASTM D2887 | ° C. | 188 |
| 30 W % | ASTM D2887 | ° C. | 233 |

TABLE 1-continued

Properties of Arab Heavy Straight Run Gas Oil

| Property | Methods | Units | Value |
|---|---|---|---|
| 50 W % | ASTM D2887 | ° C. | 273 |
| 70 W % | ASTM D2887 | ° C. | 309 |
| 90 W % | ASTM D2887 | ° C. | 347 |
| 95 W % | ASTM D2887 | ° C. | 361 |
| 100 W % | ASTM D2887 | ° C. | 394 |

TABLE 2

Product Yields

| Fractions | W % |
|---|---|
| H2S | 1.21 |
| NH3 | 0.00 |
| C1 | 0.00 |
| C2 | 0.01 |
| C3 | 0.01 |
| C4 | 0.02 |
| Naphtha (177° C.−) | 6.50 |
| Diesel (177-370° C.) | 90.07 |
| Residue (370° C.+) | 2.39 |
| Total | 100.21 |
| H2 consumption | 0.21 |

TABLE 3

Properties of Hydrotreated Straight Run Gas Oil

| Property | Method | Units | Value | Value | Value |
|---|---|---|---|---|---|
| Stream Name | | | Hydro-treated effluent | Aromatic Lean | Aromatic Rich |
| Density | ASTM D 4052 | g/cm$^3$ | 0.8231 | 0.817 | 0.917 |
| Sulfur (Total) | ASTM D 5453 | ppmw | 335 | 70.45 | 264.55 |
| Non-Aromatic Sulfur | | ppmw | 21 | 21 | 0 |
| Dibenzothiophene | | ppmw | 19 | 1 | 18 |
| 4.methy- Dibenzothiophene | | ppmw | 107 | 5 | 102 |
| 4,6.methyl. Dibenzothiophene | | ppmw | 156 | 8 | 148 |
| Heavy-Dibenzothiophene heavy | | ppmw | 33 | 2 | 31 |
| Aromatic Sulfur | | ppmw | 315 | 21 | 315 |
| Nitrogen | ASTM D 4629 | ppmw | 8 | 1 | 7 |
| Hydrogen | ASTM D 5291 | W % | 13.74 | — | — |
| Simulated Distillation | ASTM D 2887 | ° C. | | | |
| IBP | ASTM D 2887 | ° C. | 149 | 149 | 159 |
| 5 W % | ASTM D 2887 | ° C. | 175 | 177 | 183 |
| 10 W % | ASTM D 2887 | ° C. | 188 | 190 | 198 |
| 30 W % | ASTM D 2887 | ° C. | 229 | 231 | 241 |
| 50 W % | ASTM D 2887 | ° C. | 266 | 270 | 278 |
| 70 W % | ASTM D 2887 | ° C. | 302 | 306 | 318 |
| 90 W % | ASTM D 2887 | ° C. | 342 | 348 | 364 |
| 95 W % | ASTM D 2887 | ° C. | 357 | 363 | 383 |
| FBP | ASTM D 2887 | ° C. | 391 | 395 | 429 |
| Paraffins + Naphthenes | ASTM D2425 | W % | 73.3 | 95.0 | 5.0 |
| Total Aromatics | ASTM D2425 | W % | 26.7 | 5.0 | 95.0 |

The hydrotreating reaction zone was operated at hydrogen partial pressure of 25.5 bars, temperature of 320° C., LHSV of 1.5 h$^{-1}$ and hydrogen feed rate of 277 SLt/Lt. The product yields are shown in Table 2. The total desulfurization was 97.1 W %, resulting in a product contains 468 ppmw of sulfur. The total hydrodenitrogenation and hydrodearomatization were 76.7 and 8.2 W %, respectively. The conversion of non-aromatic sulfur was 99.8 W % while the conversion of aromatic sulfur was 88.7 W %. Distribution of sulfur species is shown in Table 3.

After separation of gas products in intermediate vessels, the total liquid products, properties of which are shown in Table 3, were sent to aromatic extraction unit for aromatic extraction using furfural as a solvent. The extractor was operated at 60° C., atmospheric pressure and at a solvent to diesel ratio of 1.1:1.0. Two fractions were obtained from the extractor: an aromatic rich fraction and an aromatic lean fraction. The aromatic lean fraction yield was 71 W % and contained 21 ppmw of sulfur, 1 ppmw of nitrogen and 5 W % aromatic compounds. The aromatic rich fraction yield was 29 W % and contained 95 W % aromatics, 315 ppmw of sulfur and 7 ppmw of nitrogen.

The aromatic rich fraction was subjected to isomerization. The isomerization reaction zone was operated at temperature of 300° C., pressure of 30 bars, LHSV of 0.5 h$^{-1}$, and hydrogen gas rate of 100 SLt/Lt of oil over Zinc impregnated Y-zeolite catalyst. The isomerized effluent was recycled to the hydrotreating reaction zone for further hydrodesulfurization. A bleed stream, 12 W %, was discharged from the system.

The method and system of the present invention have been described above and in the attached drawings; however, modifications will be apparent to those of ordinary skill in the art and the scope of protection for the invention is to be defined by the claims that follow.

I claim:

1. An apparatus for processing a hydrocarbon feed containing undesired organosulfur compounds comprising:
   a mild hydrotreating zone operable to convert labile organosulfur compounds, the mild hydrotreating zone including an inlet for receiving the hydrocarbon feed and an outlet for discharging hydrotreated effluent;
   an aromatic separation zone including a stage-type extractor or a differential extractor, and a source of liquid solvent as aromatic extraction medium, the aromatic separation zone operable to extract aromatic organosulfur compounds from the hydrotreated effluent, the aromatic separation zone including one or more inlets for receiving the hydrotreated effluent and liquid solvent, an aromatic-rich outlet and an aromatic-lean outlet; and
   an isomerization reaction zone having
      an inlet in fluid communication with the aromatic-rich outlet and
      an isomerization reaction zone outlet in fluid communication with the mild hydrotreating zone inlet for recycling isomerate.

2. The apparatus as in claim 1, further comprising a flashing zone having an inlet in fluid communication with the hydrotreated effluent discharge outlet, an outlet for discharging light hydrotreated effluent and an outlet in fluid communication with the aromatic separation zone for discharging heavy hydrotreated effluent.

3. The apparatus as in claim 1, further comprising a flashing zone having an inlet in fluid communication with the isomerized effluent discharge outlet, an outlet for discharging light isomerized effluent and an outlet in fluid communication with the aromatic separation zone for discharging heavy isomerized effluent.

4. The apparatus as in claim 1, further comprising an adsorption zone having an inlet in fluid communication with the aromatic-rich discharge outlet and an adsorption zone outlet for discharging extract having a reduced concentration of nitrogen-containing compounds, wherein the isomerization reaction zone inlet is in fluid communication with the adsorption zone outlet.

5. The apparatus as in claim 1, wherein the aromatic separation zone includes a mixer-settler apparatus.

6. The apparatus as in claim 1, wherein the aromatic separation zone includes a centrifugal contactor.

7. The apparatus of claim 1, wherein the aromatic separation zone includes a contacting column.

8. The apparatus of claim 7, wherein the contacting column is a tray column.

9. The apparatus of claim 7, wherein the contacting column is a packed bed column.

10. The apparatus of claim 7, wherein the contacting column is a rotating disc contactor.

11. The apparatus of claim 7, wherein the contacting column is a pulse column.

12. The apparatus as in claim 1, wherein the isomerization reaction zone contains isomerization catalyst selected the group consisting of zeolites, molecular sieves, aluminosilicates, aluminosilicates, aluminophosphates, silicoaluminophosphates, sulfated zirconia, tungstated zirconia, niobic acid, supported heteropolyacids, derivatives of supported heteropolyacids, bulk heteropolyacids, and derivatives of bulk heteropolyacids, and wherein the isomerization catalyst possesses an acidity of at least 15 times more than the acidity of amorphous silica-alumina catalyst at a temperature of 260° C.

13. An apparatus for processing a hydrocarbon feed containing undesired organosulfur compounds comprising:
   a mild hydrotreating zone operable to convert labile organosulfur compounds, the mild hydrotreating zone including an inlet for receiving the hydrocarbon feed and an outlet for discharging hydrotreated effluent;
   an aromatic separation zone operable to extract aromatic organosulfur compounds from the hydrotreated effluent, the aromatic separation zone including an inlet for receiving the hydrotreated effluent, an aromatic-rich outlet and an aromatic-lean outlet;
   an adsorption zone having an inlet in fluid communication with the aromatic-rich discharge outlet and an adsorption zone outlet for discharging extract having a reduced concentration of nitrogen-containing compounds,
   an isomerization reaction zone having
      an inlet in fluid communication with the adsorption zone outlet and
      an isomerization reaction zone outlet in fluid communication with the mild hydrotreating zone inlet for recycling isomerate.

14. The apparatus as in claim 13, further comprising a flashing zone having an inlet in fluid communication with the hydrotreated effluent discharge outlet, an outlet for discharging light hydrotreated effluent and an outlet in fluid communication with the aromatic separation zone for discharging heavy hydrotreated effluent.

15. The apparatus as in claim 13, further comprising a flashing zone having an inlet in fluid communication with the isomerized effluent discharge outlet, an outlet for discharging light isomerized effluent and an outlet in fluid communication with the aromatic separation zone for discharging heavy isomerized effluent.

16. The apparatus as in claim 13, wherein the aromatic separation zone includes a mixer-settler apparatus.

17. The apparatus as in claim 13, wherein the aromatic separation zone includes a centrifugal contactor.

18. The apparatus as in claim 13, wherein the aromatic separation zone includes a contacting column.

19. The apparatus as in claim 18, wherein the contacting column is a tray column.

20. The apparatus of claim 18, wherein the contacting column is a packed bed column.

21. The apparatus of claim 18, wherein the contacting column is a rotating disc contactor.

22. The apparatus of claim 18, wherein the contacting column is a pulse column.

23. The apparatus as in claim 18, wherein the isomerization reaction zone contains isomerization catalyst selected the group consisting of zeolites, molecular sieves, aluminosilicates, aluminosilicates, aluminophosphates, silicoaluminophosphates, sulfated zirconia, tungstated zirconia, niobic acid, supported heteropolyacids, derivatives of supported heteropolyacids, bulk heteropolyacids, and derivatives of bulk heteropolyacids, and wherein the isomerization catalyst possesses an acidity of at least 15 times more than the acidity of amorphous silica-alumina catalyst at a temperature of 260° C.

* * * * *